United States Patent [19]

Yamamoto et al.

[11] Patent Number: 5,124,386
[45] Date of Patent: Jun. 23, 1992

[54] RESIN COMPOSITION HAVING GOOD ANTISTATIC PROPERTY

[75] Inventors: Naoki Yamamoto; Hiroshi Mori; Masaharu Fujimoto; Hiroki Hatakeyama, all of Otake, Japan

[73] Assignee: Mitsubishi Rayon Company Ltd., Tokyo, Japan

[21] Appl. No.: 639,891

[22] Filed: Jan. 11, 1991

[51] Int. Cl.$^5$ .............. C08K 5/20; C08K 5/10; C08F 22/40
[52] U.S. Cl. .............. 524/220; 524/317; 526/262
[58] Field of Search .............. 524/110

[56] References Cited

U.S. PATENT DOCUMENTS 4,298,710 11/1981 Ohya et al. .............. 525/5
4,981,892 1/1991 Nishida et al. .............. 524/291

FOREIGN PATENT DOCUMENTS 60-23447 2/1985 Japan .
1-075290 3/1989 Japan .

OTHER PUBLICATIONS

Plasdoc-Central Patents Index-Basic Abstracts Journal, accession No. 89-127712, London, GB; & JP-A-1 075 290 (Mitsubishi Rayon K.K.) Sep. 18, 1987.

Primary Examiner—Joseph L. Schofer
Assistant Examiner—Wu C. Cheng
Attorney, Agent, or Firm—Oblon, Spivak, McClelland, Maier & Neustadt

[57] ABSTRACT

Disclosed is a resin composition comprised of (A) 100 parts by weight of a polymer containing at least 10% by weight of methacrylimide units and (B) 0.5 to 20 parts by weight of a specific polyhydric alcohol compound and/or a specific compound having polyoxyethylene segments. This resin composition provides a shaped article having a good antistatic property and heat resistance.

4 Claims, No Drawings

RESIN COMPOSITION HAVING GOOD ANTISTATIC PROPERTY

BACKGROUND OF THE INVENTION (1) Field of the Invention

This invention relates to a resin composition having a good antistatic property and heat resistance, which comprises a specific methacrylimide group-containing polymer, and incorporated therein, a specific polyhydric alcohol compound and/or a compound having polyoxyethylene segments.

(2) Description of the Related Art

A methacrylimide group-containing polymer has a good heat resistance and transparency, a relatively high heat distortion temperature, a good rigidity, surface hardness, and molding processability, but this polymer has a problem in that the electric resistance value is large and the polymer is easily statically charged by for example, rubbing or peeling.

A method of an internal kneading of an antistatic agent is generally adopted for imparting an antistatic property to plastics, and in this method, an antistatic agent having a good compatibility with a base resin must be selected. If an antistatic agent having a poor compatibility with the base resin is used, problems such as a sticky surface and the precipitation of a white powder are caused by an excessive migration or bleeding of the antistatic agent to the surface, and furthermore, the inherent transparency of the resin becomes poor. In contrast, if an antistatic agent having a good compatibility with the base resin is used, the antistatic agent is uniformly dispersed in the resin, and a substantial antistatic effect is not manifested.

A methacrylimide group-containing polymer has a relatively high glass transition temperature, and therefore, a migration of an antistatic agent to the surface becomes more difficult. Moreover, since the molding temperature of this polymer is high, the antistatic agent per se must have a high heat stability.

Namely, appropriate antistatic agents must be developed for respective base resins, but an antistatic agent effective for the methacrylimide group-containing polymer has not been developed.

A resin composition comprised of a methacrylimide group-containing polymer and a fatty acid glyceride ester is described in Japanese Unexamined Patent Publication No. 64-75290. It is taught that this resin composition has an improved moldability as compared with a methacrylimide group-containing polymer, but this publication is silent on the antistatic property thereof.

A resin material having an antistatic property and a good heat resistance has not been known, and a development of this resin material is required.

SUMMARY OF THE INVENTION

A primary object of the present invention is to obviate the defect of a methacrylimide group-containing polymer, and provide a resin composition having a good antistatic property and a high heat resistance.

In accordance with the present invention, there is provided a resin composition having a good antistatic property and heat resistance, which comprises (A) 100 parts by weight of a polymer comprising at least 10% by weight of methacrylimide units represented by the following general formula (I):

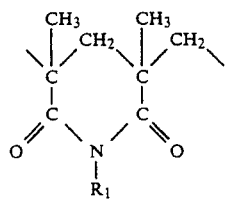

wherein $R_1$ represents a hydrogen atom or an aliphatic, aromatic or alicyclic hydrocarbon having 1 to 20 carbon atoms, and (B) 0.5 to 20 parts by weight of at least one compound selected from polyhydric alcohol compounds and compounds having polyoxyethylene segments, which are represented by the following general formulae (II) through (X):

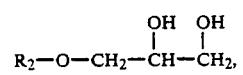

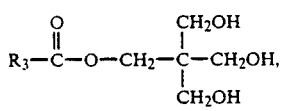

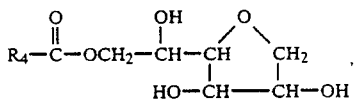

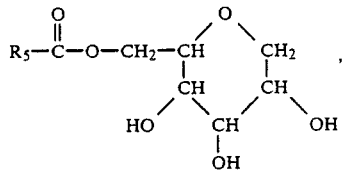

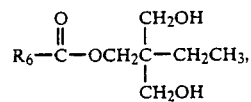

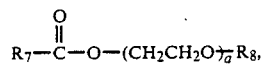

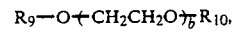

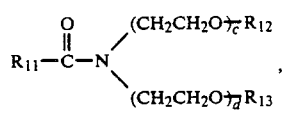

and

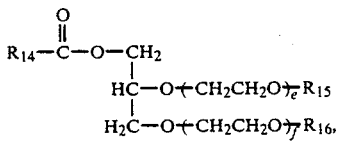

wherein $R_2$ through $R_7$, $R_9$, $R_{11}$ and $R_{14}$ represent an alkyl group having 8 to 22 carbon atoms, $R_8$, $R_{10}$, $R_{12}$, $R_{13}$, $R_{15}$, $R_{16}$ represent a hydrogen atom or an alkyl group having up to 22 carbon atoms, and a, b, c, d, e, and f are integers of from 1 to 200, with the proviso that the sum of c and d is in the range of from 2 to 200 and the sum of e and f is in the range of from 2 to 200.

DESCRIPTION OF THE PREFERRED EMBODIMENTS

The methacrylimide group-containing polymer used as the component (A) in the present invention comprises methacrylimide units as represented by general formula (I), and the polymer (A) can be either a homopolymer or a copolymer. In general formula (I), R preferably represents a hydrogen atom, a methyl group, an ethyl group, a propyl group, a butyl group or a phenyl group.

The methacrylimide group-containing polymer used in the present invention comprises at least 10% by weight, preferably at least 20% by weight, of the above-mentioned methacrylimide units. If the content of the methacrylimide units is lower than 10% by weight, the high heat resistance inherently possessed by this polymer is substantially not manifested.

The methacrylimide group-containing polymer (A) may contain units which have not been imidized when a methacrylic polymer is subjected to imidization. Such groups include, for example, units derived from an alkyl methacrylate such as methyl methacrylate and units derived from an alkyl methacrylate and another ethylenically unsaturated monomer.

The process for the preparation of the methacrylimide group-containing polymer used in the present invention is not particularly critical. For example, there can be advantageously adopted a process comprising reacting at an elevated temperature a methacrylic resin such as polymethyl methacrylate with ammonia or a primary amine such as methylamine or ethylamine in an appropriate solvent, for example, an aromatic hydrocarbon such as benzene, toluene or xylene, an alcohol such as methanol, ethanol or propanol, or a mixed solvent of at least two solvents selected from these aromatic hydrocarbons and alcohols, at a temperature of 170° to 350° C., preferably 200° to 300° C., in an autoclave. Furthermore, the reaction can be carried out in an extruder, as disclosed in Japanese Unexamined Patent Publication No. 52-63989.

At least one compound selected from polyhydric alcohol compounds and compounds having polyoxyethylene segments, which are represented by general formulae (II) through (X), are used as the component (B). As the compound (B), there can be mentioned fatty acid/ethylene oxide adducts, aliphatic alcohol/ethylene oxide adducts, fatty acid amide/ethylene oxide adducts, glycerol monofatty acid ester/ethylene oxide adducts, glycerol monoaliphatic ethers, pentaerythritol monofatty acid esters, sorbitol monofatty acid esters, and trimethylolpropane monofatty acid esters. Fatty acids and aliphatic alcohols in these compounds are those having 8 to 22 carbon atoms, and as specific examples, there can be mentioned octanoic acid, lauric acid, myristic acid, palmitic acid, stearic acid, montanic acid, oleic acid, behenic acid, octyl alcohol, lauryl alcohol, stearyl alcohol, and behenyl alcohol. If a fatty acid or aliphatic alcohol having up to 7 carbon atoms is used, the compatibility of the compound (B) with the base resin is poor and surging occurs in an extruder at the pellet-making step. In view of the stability of manifestation of the antistatic property, a compound (B) comprising stearic acid or stearyl alcohol is preferably used, and glycerol monostearyl ether is especially preferably used.

The number of added ethylene oxide units is 1 to 200 per molecule of the compound (B). If the number of added ethylene oxide units is larger than 200, the antistatic property of the obtained resin composition becomes poor.

The compound (B) is incorporated in an amount of 0.5 to 20 parts by weight, preferably 2 to 15 parts by weight, more preferably 5 to 10 parts by weight, per 100 parts by weight of the methacrylimide group-containing polymer. If the amount of the compound (B) added is smaller than 0.5 part by weight, a substantial antistatic effect is not manifested. Incorporation of the compound (B) in an amount exceeding 20 parts by weight is not preferred from the economical viewpoint. In view of the stability of the manifestation of the antistatic effect, most preferably the compound (B) is incorporated in an amount of 5 to 10 parts by weight.

The resin composition of the present invention is characterized in that the heat distortion temperature of the resin composition can be optionally adjusted according to the structure and content of the methacrylimide units in the methacrylimide group-containing polymer (A) and the amount of the compound (B) added. A heat distortion temperature of about 100° C. is generally sufficient for ordinary use, and a resin composition having such a heat distortion temperature can be shaped under shaping conditions customarily adopted for methacrylic resins and the like. When the resin composition is used in fields where a high heat resistance is required, the heat distortion temperature can be adjusted to 100° to 170° C. Namely, the heat resistance of the resin composition can be freely adjusted according to the intended use.

The composition of the present invention can be prepared by melt-kneading the methacrylimide group-containing polymer (A) together with the compound (B) in an extruder or the like. A part or all of the compound (B) can be added at the step of preparing the acrylimide group-containing polymer (A). In general, the former process is preferably adopted, in view of the stability of the methacrylimide group-containing polymer.

The thermal decomposition-preventing agent, an anti-oxidant, and an ultraviolet absorber can be incorporated in the resin composition of the present invention, to improve the heat resistance, light resistance, and resistance to oxidative deterioration. Furthermore, a plasticizer, a dye, a lubricant and the like can be incorporated in the resin composition of the present invention.

The resin composition of the present invention can be shaped into various articles by known plastic shaping methods such as press molding, injection molding and extrusion shaping.

The present invention will now be described in detail with reference to the following examples.

In the following examples and comparative examples, all of "parts" and "%" are by weight.

In the examples and comparative examples, the physical properties of polymers were determined according to the following methods.

(1) Heat distortion temperature

The heat distortion temperature was determined according to ASTM D-648-56 under a load of 18.6 kg/cm$^2$.

(2) Imidization degree (%) of methacrylimide group-containing polymer

The imidization degree (%) was determined from the nitrogen content in the elementary analysis values measured by a CHN coder (MT-3 supplied by Yanagimoto Seisakusho) and the proton NMR spectrum measured by a spectrometer 100 MHz (JNM-FX-100 supplied by JEOL).

(3) Surface resistance value

A sample was subjected to moisture conditioning at a temperature of 20° C. and a relative humidity of 65% for 1 day, a voltage of 500 V was applied to the sample at a temperature of 20° C. and a relative humidity of 65% for 1 minute, and the surface resistance value (Ω) was measured by a high megohm meter (TR-8601 supplied by Takeda-Riken).

(4) Charge half-value time

A sample was subjected to moisture conditioning at a temperature of 20° C. and a relative humidity of 65% for 1 day, and the charge was measured under an applied voltage of 10,000 V at a sample rotating speed of 1,300 rpm, a temperature of 20° C. and a relative humidity of 65% for an application time of 30 seconds. The time required for the sample voltage to drop to ½ of the initial voltage after the application of the voltage was stopped was measured by using a static honest meter (supplied by Shishido Shokai) and designated as the charge half-value times (seconds). Note, change half-value times longer than 2 minutes are indicated by the mark "∞".

(5) Transparency

The transparency was evaluated based on the haze value measured by an integrating sphere haze meter (SEP-H-SS supplied by Nippon Seimitsu Kogaku).

(6) Inherent viscosity of polymer

The flow time (ts) of a chloroform solution having a sample polymer concentration of 0.5% by weight and the flow time (to) of chloroform were measured at a temperature of 25° C.±0.1° C. by a Deereax-Bishoff viscometer, the relative viscosity ηrel of the polymer was determined from the value of ts/to, and the inherent viscosity was calculated according to the following formula:

$$\text{Inherent viscosity} = \lim_{C \to 0} (\ln \eta rel)/C (dl/g)$$

wherein C represents the number of grams of the polymer in 100 ml of the solvent.

Referential Example A (preparation of methacrylimide-containing polymers)

Referential Example A-1

A 10-liter reaction vessel equipped with a paddle spiral agitator, a pressure gauge, a sample injector, and a jacket heater was charged with 100 parts of a thoroughly dried methyl methacrylate polymer having an inherent viscosity of 0.51, 90 parts of toluene and 10 parts of methanol, and the inner atmosphere was replaced by nitrogen. The temperature was elevated to 200° C. and the mixture was stirred to prepare a solution. Then, 21.7 parts (molar ratio=0.7) of methylamine was added to the solution from the sample injector. The reaction was carried out under heating and an inner pressure of 60 kg/cm² for 3 hours, and a methacrylimide group-containing polymer (A-1) was obtained by this reaction. The polymer was dried and powdered to obtain a sample.

Referential Example A-2

A methacrylimide group-containing polymer (A-2) was prepared in the same manner as described in Example 1, except that 24.8 parts (molar ratio=0.8) of methylamine was used.

Referential Example A-3

A methacrylimide group-containing polymer (A-3) was prepared in the same manner as described in Example 1, except that 15.5 parts (molar ratio=0.5) of methylamine was used.

Referential Example A-4

A methacrylimide group-containing polymer (A-4) was prepared in the same manner as described in Example 1, except that 12.4 parts (molar ratio=0.4) of methylamine was used.

Referential Example A-5

A methacrylimide group-containing polymer (A-5) was prepared in the same manner as described in Example 1, except that ammonia was used at a molar ratio of 0.7 instead of methylamine. The characteristics of the methacrylimide group-containing polymers A-1 through A-5 prepared in Referential Examples A-1 through 5 were evaluated. The results are shown in Table 1.

TABLE 1

| Referential Example No. | Starting polymer for imidization reaction | Imidization degree (%) | Heat distortion temperature (°C.) |
|---|---|---|---|
| A-1 | MMA polymer | 80 | 140 |
| A-2 | MMA polymer | 88 | 150 |
| A-3 | MMA polymer | 73 | 130 |
| A-4 | MMA polymer | 65 | 120 |
| A-5 | MMA polymer | 73 | 190 |

Referential Example B

The following compounds were used as the compound (B) in the examples given hereinafter.
B-1: glycerol monostearyl ether
B-2: glycerol mono-octyl ether
B-3: glycerol monobehenyl ether
B-4: pentaerythritol monostearate
B-5: sorbitol monostearate
B-6: trimethylolpropane monostearate
B-7: 10-mole ethylene oxide adduct to stearic acid
B-8: 9-mole ethylene oxide adduct to lauryl alcohol
B-9: 20-mole ethylene oxide adduct to behenyl alcohol
B-10: 15-mole ethylene oxide adduct to stearic acid amide
B-11: 2-mole ethylene oxide adduct to glycerol monostearate
B-12: 5-mole ethylene oxide adduct to glycerol monostearate
B-13: 55-mole ethylene oxide adduct to stearic acid

EXAMPLES 1 THROUGH 13

A composition prepared by incorporating 10 parts of a compound (B) shown in Referential Example B in the methacrylimide group-containing polymer (A-1) obtained in Referential Example A-1 was extrusion-shaped into a pellet.

The pellet was injection-molded under the injection molding conditions shown below to form a test piece for the evaluation of the heat resistance and a flat test piece. The heat distortion temperature, antistatic property, and transparency were determined, and the results are shown in Table 2.

(Injection Molding Conditions)

Injection molding machine: Promat 165/75 supplied by Sumitomo Juki
Molding temperature: 100° C.
Injection molding temperature: 300° C.

EXAMPLES 14 THROUGH 17 AND COMPARATIVE EXAMPLES 1 THROUGH 5

A resin composition prepared by incorporating 10 parts of a compound (B-1) shown in Referential Example (B) in 100 parts of the methacrylimide group-containing polymer (A) obtained in Referential Example A-2, A-3, A-4 or A-5 was molded into test pieces for the measurement of various physical properties by injection molding cylinder temperature 320° C., mold temperature 100° C.). The results of the measurement of the physical properties are shown in Table 3.

For comparison, the methacrylimide group-containing polymers (A-1) through (A-5) obtained in Referential Examples A-1 through A-5 were independently molded without incorporation of the compound (B), and the physical properties were similarly evaluated. The results are shown in Table 3.

TABLE 3

| | Composition | | | Antistatic property | | Transparency, haze value (%) | Heat resistance, heat distortion temperature (°C.) |
|---|---|---|---|---|---|---|---|
| | Kind of methacrylimide-containing polymer (A) | Compound (B) | | Surface resistance value (Ω) | Charge half-value time (seconds) | | |
| | | Kind | Amount (parts) | | | | |
| Example 14 | A-2 | B-1 | 10 | $6 \times 10^{10}$ | 1.0 | <2.0 | 120 |
| Example 15 | A-3 | B-1 | 10 | $4 \times 10^{10}$ | <1 | <2.0 | 100 |
| Example 16 | A-4 | B-1 | 10 | $5 \times 10^{10}$ | 1.0 | <2.0 | 90 |
| Example 17 | A-5 | B-1 | 10 | $4 \times 10^{10}$ | <1 | <2.0 | 160 |
| Comparative Example 1 | A-1 | — | — | $>10^{15}$ | ∞ | <2.0 | 140 |
| Comparative Example 2 | A-2 | — | — | $>10^{15}$ | ∞ | <2.0 | 150 |
| Comparative Example 3 | A-3 | — | — | $>10^{15}$ | ∞ | <2.0 | 130 |
| Comparative Example 4 | A-4 | — | — | $>10^{15}$ | ∞ | <2.0 | 120 |
| Comparative Example 5 | A-5 | — | — | $>10^{15}$ | ∞ | <2.0 | 190 |

EXAMPLES 18 THROUGH 23

A composition prepared by incorporating the compound (B-1) shown in Referential Example B in an amount shown in Table 4 in 100 parts of the methacrylimide group-containing polymer (A-1) or (A-5) obtained in Referential Example A-1 or A-5 was molded into a test piece in the same manner as described in Example 1, and the various physical properties were measured. The results are shown in Table 4.

TABLE 2

| Example No. | Composition | | | Antistatic property | | Transparency, haze value (%) | Heat resistance, heat distortion temperature (°C.) |
|---|---|---|---|---|---|---|---|
| | Kind of methacrylimide-containing polymer (A) | Compound (B) | | Surface resistance value (Ω) | Charge half-value time (seconds) | | |
| | | Kind | Amount (parts) | | | | |
| 1 | A-1 | B-1 | 10 | $6 \times 10^{10}$ | 1.1 | <2.0 | 110 |
| 2 | A-1 | B-2 | 10 | $6 \times 10^{11}$ | 2.1 | <2.0 | 110 |
| 3 | A-1 | B-3 | 10 | $3 \times 10^{11}$ | 1.6 | <2.0 | 110 |
| 4 | A-1 | B-4 | 10 | $4 \times 10^{11}$ | 1.5 | <2.0 | 110 |
| 5 | A-1 | B-5 | 10 | $6 \times 10^{11}$ | 2.1 | <2.0 | 110 |
| 6 | A-1 | B-6 | 10 | $7 \times 10^{11}$ | 2.8 | <2.0 | 110 |
| 7 | A-1 | B-7 | 10 | $2 \times 10^{11}$ | 1.3 | <2.0 | 110 |
| 8 | A-1 | B-8 | 10 | $3 \times 10^{11}$ | 1.5 | <2.0 | 110 |
| 9 | A-1 | B-9 | 10 | $9 \times 10^{10}$ | 1.2 | <2.0 | 115 |
| 10 | A-1 | B-10 | 10 | $1 \times 10^{11}$ | 1.2 | <2.0 | 115 |
| 11 | A-1 | B-11 | 10 | $5 \times 10^{10}$ | 1.0 | <2.0 | 110 |
| 12 | A-1 | B-12 | 10 | $6 \times 10^{10}$ | 1.0 | <2.0 | 110 |
| 13 | A-1 | B-13 | 10 | $3 \times 10^{10}$ | 1.4 | — | 110 |

TABLE 4

| Example No. | Composition Kind of methacrylimide-containing polymer (A) | Compound (B) Kind | Compound (B) Amount (parts) | Antistatic property Surface resistance value (Ω) | Antistatic property Charge half-value time (seconds) | Transparency, haze value (%) | Heat resistance, heat distortion temperature (°C.) |
|---|---|---|---|---|---|---|---|
| 18 | A-1 | B-1 | 2 | $4 \times 10^{13}$ | 14.2 | <2.0 | 135 |
| 19 | A-1 | B-1 | 5 | $6 \times 10^{12}$ | 5.3 | <2.0 | 125 |
| 20 | A-1 | B-1 | 8 | $2 \times 10^{11}$ | 1.4 | <2.0 | 115 |
| 21 | A-1 | B-1 | 15 | $1 \times 10^{10}$ | <1 | <2.0 | 95 |
| 22 | A-1 | B-1 | 20 | $5 \times 10^{9}$ | <1 | <2.0 | 80 |
| 23 | A-5 | B-1 | 20 | $6 \times 10^{9}$ | <1 | <2.0 | 130 |

COMPARATIVE EXAMPLE 6

A composition prepared by incorporating 10 parts of a cationic antistatic agent (Duspar 125B supplied by Miyoshi Yushi) in 100 parts of the methacrylimide group-containing polymer (A-1) obtained in Referential Example A-1 was molded into a test piece in the same manner as described in Example 1, and the physical properties were evaluated.

It was found the surface resistance value was larger than $1 \times 10^{15}$ Ω, the charge half-value time was ∞, and the haze value was 61%, and thus it was confirmed that a substantial antistatic effect was not manifested and that the transparency became poor. The molded article was discolored yellow, and had no commercial value.

COMPARATIVE EXAMPLE 7

A composition formed by incorporating 5 parts of a cationic antistatic agent (Duspar 125B supplied by Miyoshi Yushi) in 100 parts of the methyl methacrylate polymer used in Referential Example A was extrusion-shaped into a pellet, and the pellet was molded into test pieces for the measurement of the physical properties by injection molding (cylinder temperature 230° C., mold temperature 70° C.), and the physical properties were evaluated.

It was found that the surface resistance value was $8.9 \times 10^{11}$ Ω, the charge half-value time was 2.1 seconds, the haze value was lower than 2.0%, and the heat distortion temperature was 85° C., and it was confirmed that a good antistatic property and a high transparency were manifested.

When Comparative Example 7 is compared with Comparative Example 6, it is seen that the methacrylimide group-containing polymer obtained by the imidization is quite different from the starting methyl methacrylate polymer in the compatibility thereof with additives and other properties.

According to the present invention, by incorporating a specific compound in a specific methacrylimide group-containing polymer, a resin composition having a good antistatic property and heat resistance can be obtained, and due to these good properties, the resin composition of the present invention can be advantageously used for the production of illuminating articles, covers and parts of electric devices and electronic instruments, meter covers, daily necessities, sheets, panels, and the like.

We claim:

1. A resin composition having a good antistatic property and heat resistance, which comprises (A) 100 parts by weight of a polymer comprising at least 10% by weight of methacrylimide units represented by formula (I):

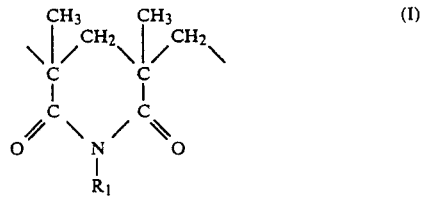

wherein $R_1$ represents a hydrogen atom or an aliphatic, aromatic or alicyclic hydrocarbon having 1 to 20 carbon atoms, and (B) 0.5 to 20 parts by weight of at least one compound selected from the group consisting of polyhydric alcohol compounds and compounds having polyoxyethylene segments, which are represented by the following formulae:

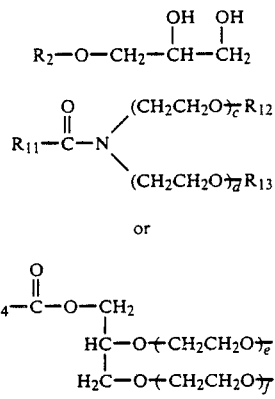

wherein $R_2$, $R_{11}$ and $R_{14}$ may be the same or different and each may represent an alkyl group having 8 to 22 carbon atoms, $R_{12}$, $R_{13}$, $R_{15}$ and $R_{16}$ represent a hydrogen atom or an alkyl group having up to 22 carbon atoms, and c, d, e, and f are integers of from 1 to 200, with the proviso that the sum of c and d is in the range of from 2 to 200 and the sum of e and f is in the range of from 2 to 200.

2. The resin composition according to claim 1, wherein the compound (B) is glycerol monostearyl ether.

3. A shaped article made of the resin composition set forth in claim 1, wherein the heat distortion temperature is higher than 90° C.

4. A shaped article made of the resin composition set forth in claim 1, wherein the heat distortion temperature is higher than 100° C.

* * * * *